United States Patent
Hemes et al.

(10) Patent No.: US 9,468,026 B2
(45) Date of Patent: Oct. 11, 2016

(54) METHOD AND SYSTEM FOR SHORTENING WIRELESS PAIRING CONNECTION TIME BY DETECTING AN OBJECT OR BODY

(71) Applicant: Logitech Europe S.A., Lausanne (CH)

(72) Inventors: Jean-Christophe Hemes, Grandson (CH); Francesco Spina, Lausanne (CH); Olivier Gay, Lausanne (CH); Gilles de Preux, Lausanne (CH); Olivier Bodenmann, Echallens (CH); Paolo Cremonino, Cantello (IT); Laurent Mealares, St-Sulpice (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/052,030

(22) Filed: Oct. 11, 2013

(65) Prior Publication Data

US 2015/0103006 A1    Apr. 16, 2015

(51) Int. Cl.

| | |
|---|---|
| *H04W 76/02* | (2009.01) |
| *H04W 4/00* | (2009.01) |
| *G06F 3/023* | (2006.01) |
| *G06F 3/033* | (2013.01) |
| *G06F 1/32* | (2006.01) |
| *G06F 3/038* | (2013.01) |

(52) U.S. Cl.
CPC ............ *H04W 76/02* (2013.01); *G06F 1/3231* (2013.01); *G06F 3/0231* (2013.01); *G06F 3/033* (2013.01); *G06F 3/0383* (2013.01); *H04W 4/008* (2013.01); *G06F 2203/0384* (2013.01); *Y02B 60/1289* (2013.01)

(58) Field of Classification Search
None
See application file for complete search history.

(56) References Cited

U.S. PATENT DOCUMENTS

| | | | |
|---|---|---|---|
| 8,798,695 B1 | 8/2014 | Zheng et al. | |
| 2002/0063477 A1* | 5/2002 | Chang | G06F 1/1613 307/140 |
| 2005/0122223 A1 | 6/2005 | Jones | |
| 2007/0046634 A1* | 3/2007 | Rice | G06F 1/3203 345/168 |
| 2007/0232254 A1 | 10/2007 | Mackey et al. | |
| 2010/0156790 A1* | 6/2010 | Su | G06F 1/3203 345/163 |
| 2010/0172450 A1 | 7/2010 | Komaili et al. | |
| 2012/0019149 A1 | 1/2012 | Shih et al. | |
| 2012/0135684 A1 | 5/2012 | Shrum, Jr. et al. | |
| 2012/0280917 A1* | 11/2012 | Toksvig | G06F 1/1626 345/173 |
| 2012/0287035 A1* | 11/2012 | Valko | G06F 1/3231 345/156 |
| 2014/0125575 A1* | 5/2014 | Samanta Singhar | G06F 3/005 345/156 |
| 2014/0235180 A1 | 8/2014 | Fortin et al. | |

OTHER PUBLICATIONS

Final Office Action mailed on Feb. 3, 2015 for U.S. Appl. No. 13/772,122, 9 pages.

(Continued)

*Primary Examiner* — Joseph Haley
*Assistant Examiner* — Emily Frank
(74) *Attorney, Agent, or Firm* — Kilpatrick Townsend & Stockton LLP

(57) ABSTRACT

Embodiments of the invention are directed to control devices configured for use with computing devices. More specifically, the present invention relates to methods and devices for shortening wireless reconnection time by determining the presence of an object or body near a device. When the control device detects an object or body in proximity to the device, the control device may automatically establish a wireless connection with a host devices, such that when the control device receives any user interactions, the wireless connection has already been established, preventing loss of data.

20 Claims, 5 Drawing Sheets

(56) References Cited

OTHER PUBLICATIONS

Non-Final Office Action mailed on Aug. 28, 2014 for U.S. Appl. No. 13/772,122, 7 pages.
Notice of Allowance mailed on May 27, 2015 for U.S. Appl. No. 13/772,122, 5 pages.
Non-Final Office Action mailed on Dec. 2, 2015 for U.S. Appl. No. 14/817,758, 5 pages.
Notice of Allowance mailed on Mar. 21, 2016 for U.S. Appl. No. 14/817,758, 5 pages.

* cited by examiner

METHOD AND SYSTEM FOR SHORTENING WIRELESS PAIRING CONNECTION TIME BY DETECTING AN OBJECT OR BODY

BACKGROUND OF THE INVENTION

Wireless control devices, such as keyboards, mice, and touchpad devices, are commonly used by users with computing devices (e.g., host devices). In order to preserve the battery life of wireless control devices, they may go into a sleep mode (e.g., a reduced power mode) or power off when they have not been used by the user for a predefined amount of time. In those situations, the wireless connection between the wireless control device and a host device may be disconnected. Later, when the user returns and begins to interact with the wireless control device, the wireless control device may return from the sleep mode and enter a fully powered or increased power state.

In prior solutions, to return a wireless control device from a sleep mode to an active mode so that the wireless control device could be re-paired with a host device, the user would have to physically interact with the wireless control device (e.g., press keys on a keyboard device, click a button or physically move a mouse device, touch or swipe a user interface of a touchpad device).

One significant problem with using a wireless control device as described above, arises when the user returns to use the wireless control device. When the user begins interacting with the control device in sleep mode, the interactions may be registered by the wireless control device but the pairing or reconnection process between the wireless control device and the computing device may not be completed. In some situations, the user may begin pressing keys or button, or otherwise interact with the wireless control device without realizing the wireless control device has not completed the pairing process with the host device. This can result in lost user interactions, as only some or none of the user interactions may be sent to the computing device once the devices are successfully paired. For example, if a user interacting with a wireless keyboard in sleep mode begins entering a password, because of the delay caused by the wireless reconnection, one or more characters of the password may be lost, or keystrokes entered by the user may not transmitted to the computing device accurately. This can result in a negative user experience as the user may be forced to re-enter their password or otherwise repeat the lost user interactions. This may also result in lost time and system resources.

Based on the foregoing, there is a need in the art for improved methods and systems related to connecting or pairing wireless control devices with computing devices.

SUMMARY OF THE INVENTION

The present invention relates generally to control devices, such as human interface devices, configured for use with electronics or computing devices. More specifically, the present invention relates to methods and systems for shortening wireless connection or pairing time between a wireless control device and a computing device by detecting the presence of an object or a body (e.g, a user) in proximity to the wireless control device.

Embodiments of the present invention may provide a method for operating a control device, the method comprising detecting, by the control device, a presence of a user proximate to the control device prior to receiving inputs from one or more interactions with the control device. The method further comprises switching a wireless connection between the control device and a system from a first mode to a second mode. The method further comprises receiving inputs at the control device, wherein the received inputs include the one or more interactions with the control device. The method further comprises generating data signals based on the received inputs, and transmitting the data signals to the system by the wireless connection.

In some embodiments of the present invention, switching the wireless connection from a first mode to a second mode is performed automatically. In some embodiments of the present invention, the first mode is a sleep mode, and the second mode is an active mode.

In some embodiments of the present invention, when the presence of the user is not detected, the method may further comprise switching the wireless connection from the second mode to the first mode.

In some embodiments of the present invention, the method may further comprise determining whether a length of time of the detected presence exceeds a threshold value. The detected presence may be ignored when the detected presence does not exceed the threshold value.

In some embodiments of the present invention, the received inputs are one of a set of keystrokes, selections, or gestures on a display screen of the control device. In some embodiments, the keystrokes are received from the control device in the form of a keyboard device, and the received inputs entered using the keyboard device include a set of keystrokes. In some embodiments, the set of keystrokes may include a password or passphrase.

In some embodiments of the present invention, the control device is a mouse device, and the received inputs include a selection made using the mouse device. For example, received inputs may include the pressing of a button or movement of a scroll wheel on the mouse device.

In some embodiments of the present invention, the control device is a touchpad device, and the received inputs include at least a gesture made along a user interface of the touchpad device.

Embodiments of the present invention may further provide a control device comprising a control circuit and a presence detection module coupled to the control circuit. The presence detection module may be configured to detect a presence of a user proximate to the control device prior to receiving inputs from one or more interactions by the user with the control device. The control device may further comprise a communications module coupled to the control circuit and configured to establish a wireless connection between the control device and a system prior to the control device receiving inputs. The control device may further comprise an input module coupled to the control circuit and configured to receive the inputs, wherein the received inputs include one or more interactions with the control device, wherein data signals are generated based on the received inputs, and wherein the data signals are transmitted to the system.

In some embodiments of the present invention, the control device may further comprise a power management module coupled to the control circuit and configured to switch the wireless connection from a first mode to a second mode when the presence detection module detects the presence of the user proximate to the control device.

Embodiments of the present invention may provide a method for managing wireless connections between a plurality of control devices and a system, the method comprising establishing, by the system, a first wireless connection between a first control device and the system and a second wireless connection between a second control device and the system. In some embodiments, the first wireless connection is in a first mode and the second wireless connection is in a second mode. The method further comprises receiving first data signals from the first control device, wherein the first data signals are based on inputs received at the first control device, including one or more interactions with the first control device. The method further comprises receiving an indication from the second control device indicating a presence of a user proximate to the second control device. The method further comprises switching the first wireless connection from the first mode to the second mode and the second wireless connection from the second mode to the first mode. The method further comprises receiving second data signals from the second control device, wherein the second data signals are based on inputs received at the second control device, including one or more interactions with the second control device.

In embodiments of the present invention the first mode is an active mode, and the second mode is an unconnected mode.

In some embodiments of the present invention, the method may further comprise receiving an indication from the first control device indicating the presence of the user proximate to the first control device, prior to receiving the first data signals from the first control device, and switching the second wireless connection from the first mode to the second mode and the first wireless connection from the second mode to the first mode.

Numerous benefits are achieved by way of the present invention over other techniques. By initiating and establishing the wireless connection based on the detected presence, and prior to the control device receiving inputs (e.g., keystrokes, selections, gestures) from one or more interactions with the control device, received inputs are not lost as typically occurs. For example, by establishing a wireless connection between a keyboard device and a computer device prior to receiving keystrokes from the user interacting with the keyboard device, once the user physically contacts the keyboard device and performs keystrokes, the user may be assured that there was no loss of input data.

Embodiments of the present invention further provide the benefit of a reduction in power consumption. In embodiments of the present invention, the control device may be powered down (e.g., placed into a sleep mode) and the control device unpaired from a host device when the presence of an object or body is not detected, and powered up and repaired with a host device when the presence of an object or body is detected.

These and other embodiments of the invention along with many of its advantages and features are described in more detail in conjunction with the text below and the attached figures.

DETAILED DESCRIPTION OF THE INVENTION

Embodiments of the invention are generally directed to systems and methods for operating a wireless control device. Embodiments are described with respect to a wireless control device in the form of a multi-modal mouse device. However, embodiments of the invention are not limited to wireless control device in the form of multi-modal mouse devices. Other embodiments contemplate input devices in other forms, including wireless keyboard devices and touchpad input devices.

Figure 1:
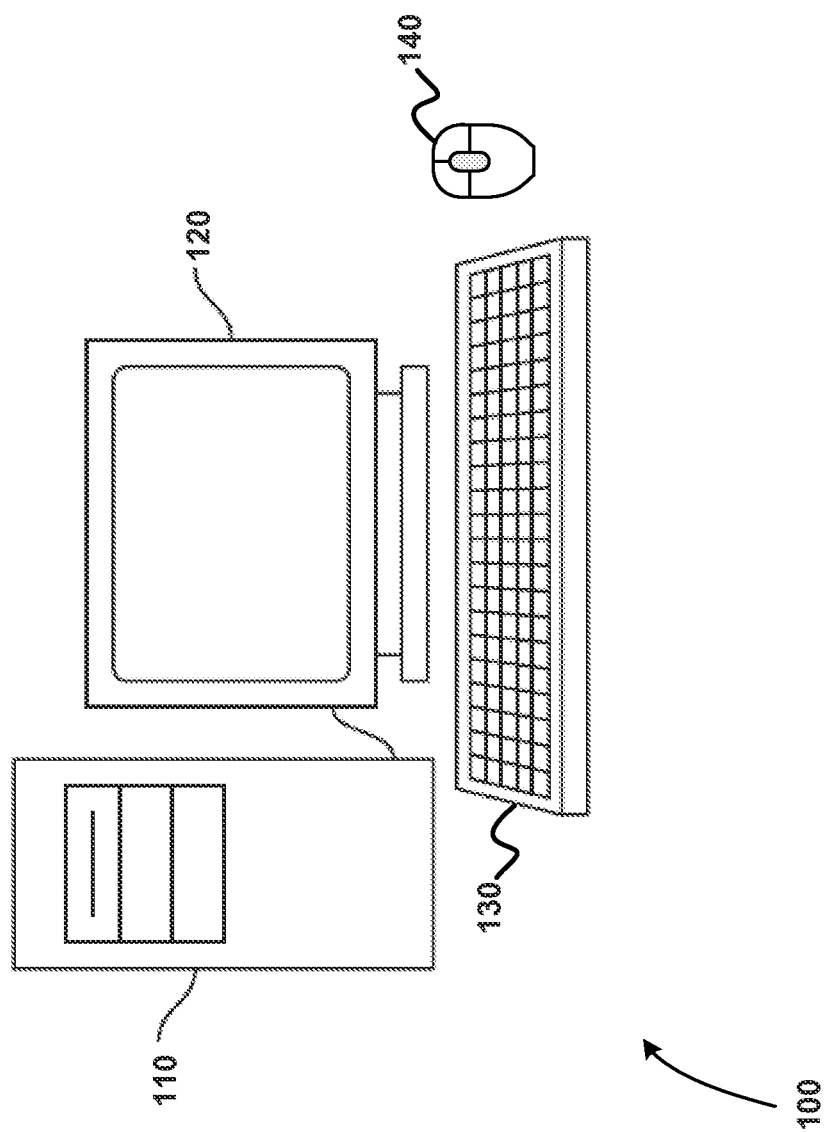
FIG. 1 illustrates a simplified diagram of a computer system according to an embodiment of the invention.

FIG. 1 is a simplified diagram of a computer system 100 according to an embodiment of the invention. Computer system 100 includes a computer 110 (which may be referred to as a host device or a system), a monitor 120, and a plurality of control devices: a keyboard device 130 and a mouse device 140. In embodiments of the present invention, the computer 110 may be a desktop computer, a laptop computer, a tablet computer, a mobile phone, a digital recording device (e.g., DVR) or any comparable computing device. In some embodiments, the mouse device 140 may be a multi-modal mouse control device 140. In computer system 100, the keyboard device 130 and the mouse device 140 may be configured to control various aspects of the computer 110 and the monitor 120. In some embodiments, the keyboard device 130 and/or the mouse device 140 may be configured to provide control signals for page scrolling, cursor movement, selection of on screen items, media control, web navigation, presentation control, and other functionality for the computer 110, as further described below. In some embodiments, the keyboard device 130 and the mouse device 140 may be operably connected to the computer 110 via a hardwire link or wireless connection. In embodiments using a wireless connection, the wireless connection may be a Bluetooth™ pairing connection or any other wireless standard or proprietary wireless network protocol.

The computer 110 may include a machine readable medium (not shown) that may be configured to store computer code, such as mouse driver software, keyboard driver software, and the like, where the computer code is executable by a processor (not shown) of the computer 110 to affect control of the computer 110 by the keyboard device 130 and/or mouse device 140. It should be noted that the control devices may also be referred to as an input device, an input/output (I/O) device, a user interface device, and the like.

Figure 2:
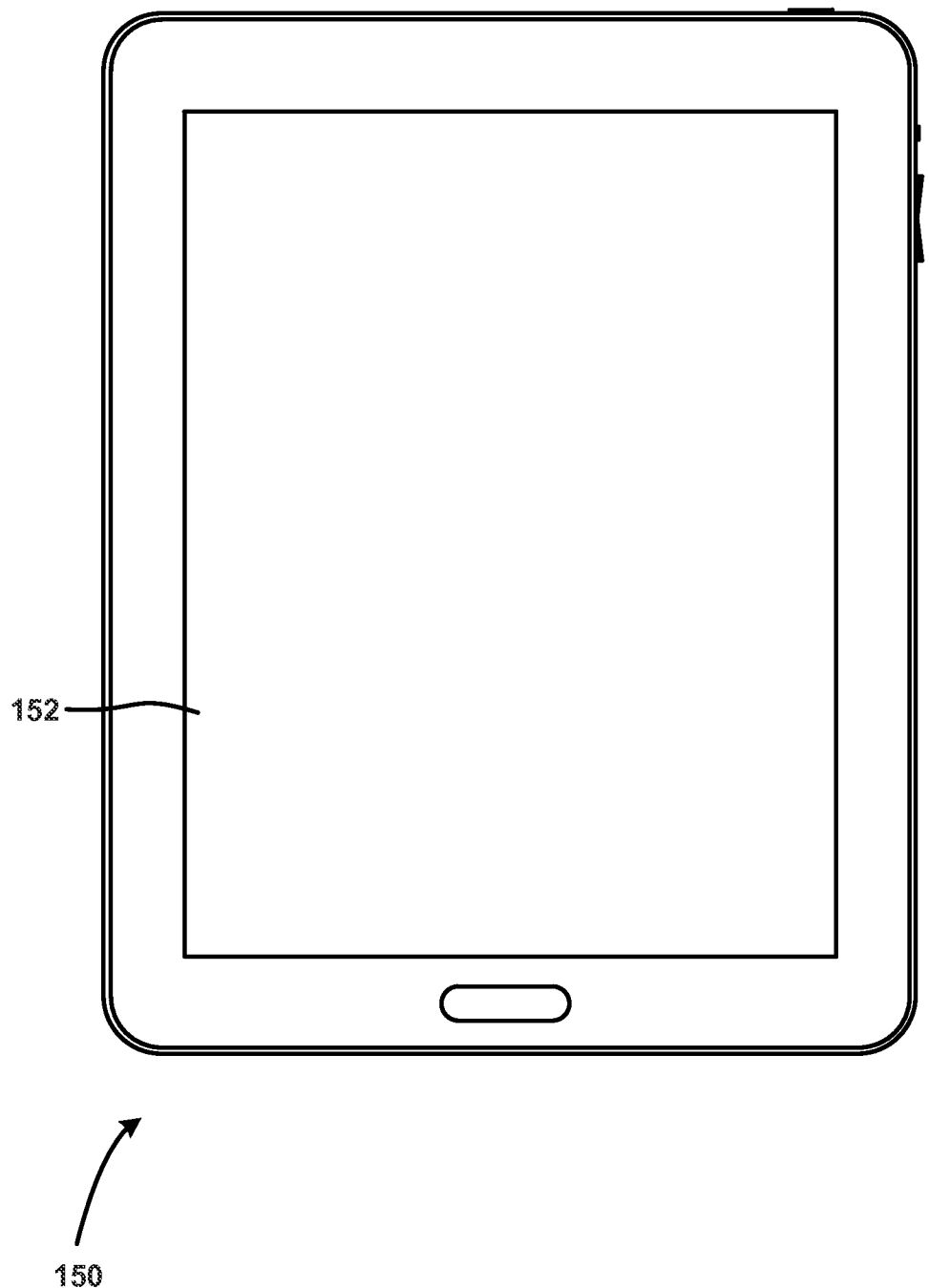
FIG. 2 illustrates a simplified diagram of a control device in the form of a touchpad device according to an embodiment of the invention.

FIG. 2 illustrates a simplified diagram of a control device in the form of a touchpad device 150 according to an embodiment of the invention. The touchpad device 150 in FIG. 2 includes a user interface 152. Exemplary touchpad devices 150 that include user interfaces 152 include touch-screen tablet computers 150. In exemplary touchpad devices 150, the user interface 152 can display applications being executed by the touchpad device 150. Embodiments of the invention are generally directed to touchpad devices 150 that include a user interface 152 configured to detect and process user interactions using a touch-screen feature of the user interface 152. The user interactions may be in the form of direct contact with the user interface 152 using the user's hand or fingers, or by a stylus or pen device. In the example depicted in FIG. 2, the touchpad device 150 is an electronic device such as an iPad® device from Apple Inc. In some alternative embodiments, the touchpad device 150 can be any other computer or electronic device including a portable or non-portable device. Exemplary embodiments of computing and electronic devices include, without limitation, the iPhone®, iPad® and iPod Touch® devices from Apple Inc., the Galaxy Note® 10.1 from Samsung, other mobile devices, tablet computers, remote control devices, smartphone devices, desktop computers, kiosks, and the like.

In some embodiments, where the control device is the touchpad device 150, the control device and the host device may be contained within a single device. In such embodiments, the user interface 152 may be the control device that directs the touchpad device 150 to produce operations on the user interface 152. In alternative embodiments, the touchpad device 150 may be a remote control that may be configured to interact with a host device separate from the touchpad device 150, including a computer 110, as well as other computing devices (e.g., receivers, audio players, digital media players, televisions and other display devices).

Figure 3:
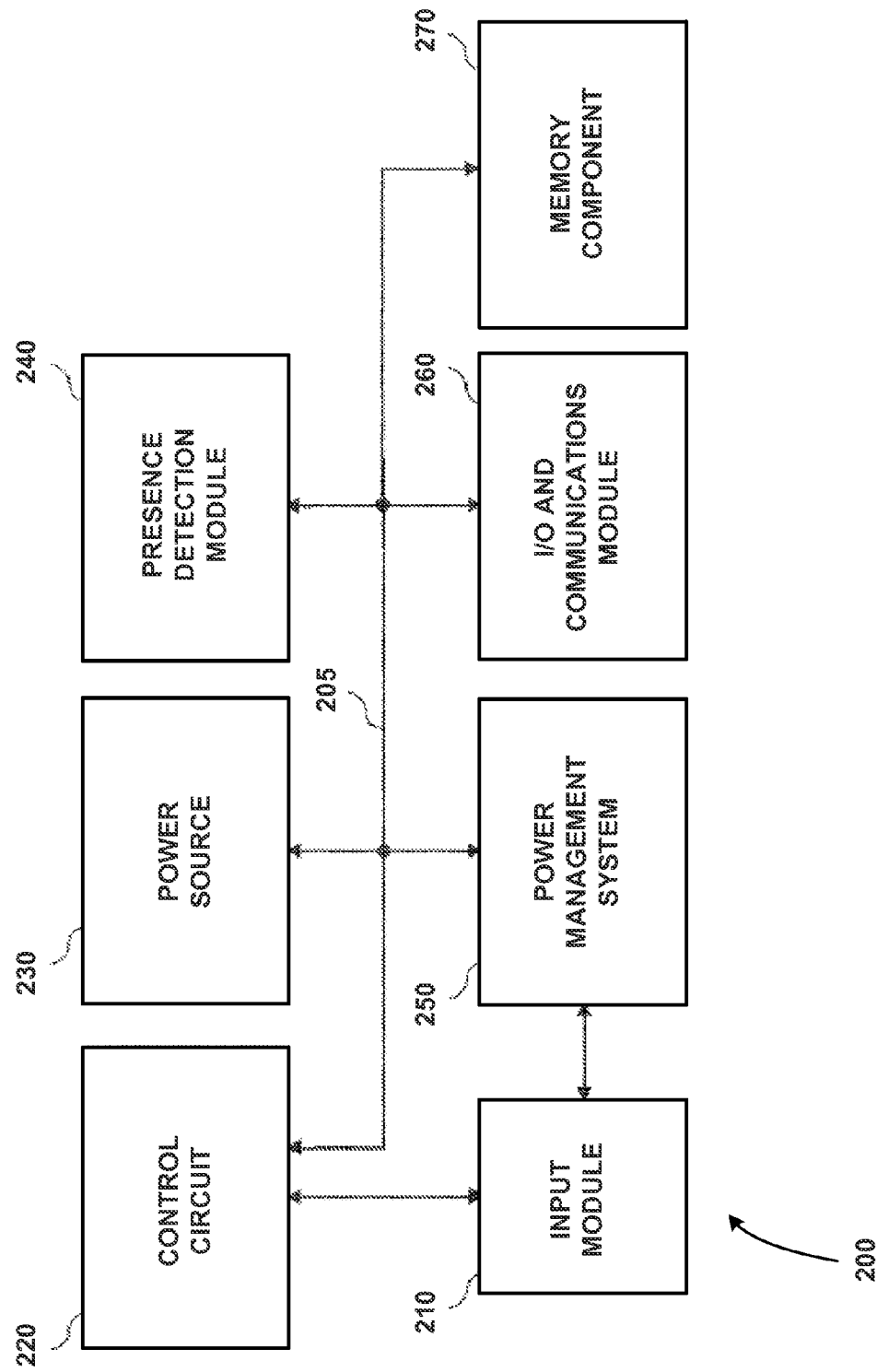
FIG. 3 illustrates a simplified block diagram of the components in a wireless control device configured to conduct presence detection of a user interacting with the wireless control device according to an embodiment of the invention.

FIG. 3 is a simplified block diagram 200 of the components of a control device according to an embodiment of the present invention. As described above, the control device may be in the form of a keyboard device 130, a multi-modal mouse device 140, or a touchpad device 150. The control device may include a bus 205, an input module 210, a control circuit 220, a power source 230, a presence detection module 240, an input/output (I/O) and communications module 250, a power management system 260, and a memory component 270. The control circuit 220, power source 230, presence detection module 240, (I/O) and communications module 250, power management system 260, and the memory component 270 may be coupled to and in electronic communication with one another via the bus 205. In some embodiments, the input module 210 may be independently connected to the control circuit 220 and power management block 260. In some embodiments, the input module 210 may be connected to the other modules via the bus 205. It should be noted that many other bus 205 configurations can be used that can include or exclude any of the various system elements of the control device as would be known by one of ordinary skill in the art.

In some embodiments, the input module 210 can include a plurality of input elements or devices. In such embodiments, the input module 210 is operable to receive inputs in response to a user engaging/interacting with an input element (e.g., pressing a key on the keyboard device 130, pressing a button or moving a scroll wheel on the multi-modal mouse device 140, or contacting or performing gestures on the user interface 152 of the touchpad device 150). The input module 210 is capable of generating control data associated with the engaged input element and sending the control data to the control circuit 220.

In some embodiments, the control circuit 220 comprises one or more microprocessors (µCs), and the control circuit 220 may be configured to control the operation of the control device. Alternatively, the control circuit 220 may include one or more microcontrollers (MCUs), digital signal processors (DSPs), field programmable gate arrays (FGPA), programmable logic devices (PLDs), or the like, with supporting hardware/firmware (e.g., memory, programmable I/Os, etc.), as would be appreciated by one of ordinary skill in the art with the benefit of this disclosure. Alternatively, MCUs, µCs, DSPs, and the like, may be configured in other system blocks of the control device. For example, a microprocessor in the computer 110 may be configured to process input commands from the input module 210 via a wireless or hardwired connection.

The power source 230 may be configured to provide power to the control device. In some embodiments, the power source 230 can include one or more rechargeable batteries including, but not limited to, the following types: lead-acid, alkaline, nickel cadmium (NiCd), nickel metal hydride (NiMH), lithium ion (Li-ion), lithium ion polymer (Li-ion polymer), or other rechargeable battery type known by those of ordinary skill in the art. In certain embodiments, the one or more rechargeable batteries can include AA type, AAA type, button cells (e.g., commonly found in watch batteries, hearing aid batteries, etc.), or other similarly sized battery types. In some embodiments, the power source 230 may be one or more solar panels configured to convert light energy into electrical energy for powering the control device.

The presence detection module 240 may be configured to detect the presence of an object or a body in proximity to the control device. The presence detection module 240 may be further configured to provide an indication to other components in the control device that the presence detection module 240 has detected the presence of the object or the body in proximity to the control device. By detecting the presence of the user or body in proximity to the control device, prior to the control device receiving inputs (e.g., keystrokes, selections, gestures) from one or more user interactions with the control device, the presence detection module 240 can initiate a process of pairing the control device with the host device (e.g., the computer 110). This can provide the technical benefit of pairing the control device with the host device prior to a user interacting with the control device. By pairing the control device prior to receiving user interactions, embodiments of the present invention prevent the loss of user interactions (e.g., keystrokes, button clicks, gestures on a user interface).

One method of detecting the presence of an object or a body in proximity to a control device is described in U.S. patent application Ser. No. 13/772,122, titled, "Method and System for Detecting an Object or Body Based on Changes in Signal Phases," filed on Feb. 20, 2013, which is herein incorporated by reference in its entirety for all purposes. Other embodiments of the present invention contemplate the use of other comparable methods and systems of detecting the presence of an object or a body.

The I/O and communications module 250 may be configured to provide input/output capabilities to the control device. For example, the I/O and communications module 250 can route data from the input module 210 to the computer 110 via a hardwire link or wireless connection. The I/O and communications module 250 can also route control data, touch sensor data, and the like, to the computer 110 for further processing. The wireless connection may be a Bluetooth™ pairing connection or any other wireless standard or proprietary wireless network protocol.

The power management block 260 may be configured to manage the electrical power supplied by power source 230 to the other components of the control device. In some embodiments, the power management block 260 can route power directly from the power source 230 to the control device. The power management block 260 can further distribute power from the power source 230 to the other system components (e.g., the input module 210, the control circuit 220, the presence detection module 240, the I/O and communications module 250, the memory component 270, or any combination thereof). In some embodiments, the power management block 260 may be further configured to control power consumption (e.g., increase or decrease power levels for the control device) when the control device switches from an active mode to a sleep mode, and vice versa.

In embodiments of the present invention, when the power management block 260 receives an indication from the presence detection module 240 that an object or body is in proximity to the control device, the power management block 260 may direct other components within the control device to conduct operations. For example, the power management block 260 may direct the power source 230 to increase power available to the control device to enable the control device to switch from the sleep mode to the active mode. The power management block 260 may also direct the I/O and communications module 250 to initiate a connection or a pairing procedure with the host device in order to pair the control device with the host device. The power management block 260 may also direct the I/O and communications module 250 to initiate the transmission of data to the host device.

In embodiments of the present invention, when the power management block 260 receives an indication from the presence detection module 240 that an object or body is not in proximity to the control device, the power management block 260 may direct the other components within the control device to conduct different operations. For example, the power management block 260 may direct the power source 230 to decrease power available to the control device to enable the control device to switch from the active mode to the sleep mode. The power management block 260 may also direct the I/O and communications module 250 to un-pair the control device from the host device and cease the transmission of data from the control device to the host device.

In alternative embodiments of the present invention, the control circuit 220 is configured to receive the indication from the presence detection module 240 indicating whether an object or body is in proximity to the control device. In such embodiments, the control circuit 220 may direct the power management block 260 to conduct the operations to place the control device into or return the control device from the sleep mode.

The memory component 270 may be configured to store data. The memory component 270 may include any hardware, software, firmware, or combination of the preceding for storing and facilitating retrieval of information. The memory component 270 may use any of a variety of data structures, arrangements, and compilations to store and facilitate retrieval of information. In some embodiments, the memory component 270 is a non-volatile memory. In some embodiments, the memory component 270 may be configured to store data from inputs (e.g., keystrokes, mouse selections, and made by the user along a user interface of the touchpad device) provided to the control device by the user. In some embodiments, the memory component 270 can store the data for the pairing between the control device and the host device. The pairing data may be stored in the memory component 270 even when the control device is powered down, such that when the control device is reactivated (e.g., powered on or switched from a sleep mode to an active mode), the previously stored pairing data may be accessed. In some embodiments, the memory component 270 may store pairing data for multiple pairing connections between the control device and a plurality of host devices.

For example, a control device in the form of a keyboard device or mouse device may be pairing data for multiple computers. Exemplary pairing data may include a shared data element, such as a passkey, that was established when the control device and the host device were paired.

The memory component 270 may further be configured to store criteria or rules for establishing a pairing or wireless connection between the control device and the host device. The criteria or rules may include an amount of time that the presence detection module 240 in the control device detects the presence of a user or body in proximity to the control device. For example, one rule may state that if the presence detection module 240 only detects the presence of the user or body for a short period of time (e.g., less than a millisecond), then a pairing process should not be initiated as the detected presence may not be from a user that intends to interact with the control device, or may be from another source. For example, the presence detection module 240 may detect minor changes in the environment (e.g. air movement, noise, an object moving far away in another room) that may register as a presence detection. Such rules may be defined by the user through control device settings, or alternatively, by a manufacturer of the control device based on specifications for the control device.

One of the technical benefits of establishing a threshold time for pairing is the conservation of power from preventing the pairing process between the control device and the host device when a connection is not required or will not be utilized.

Figure 4:
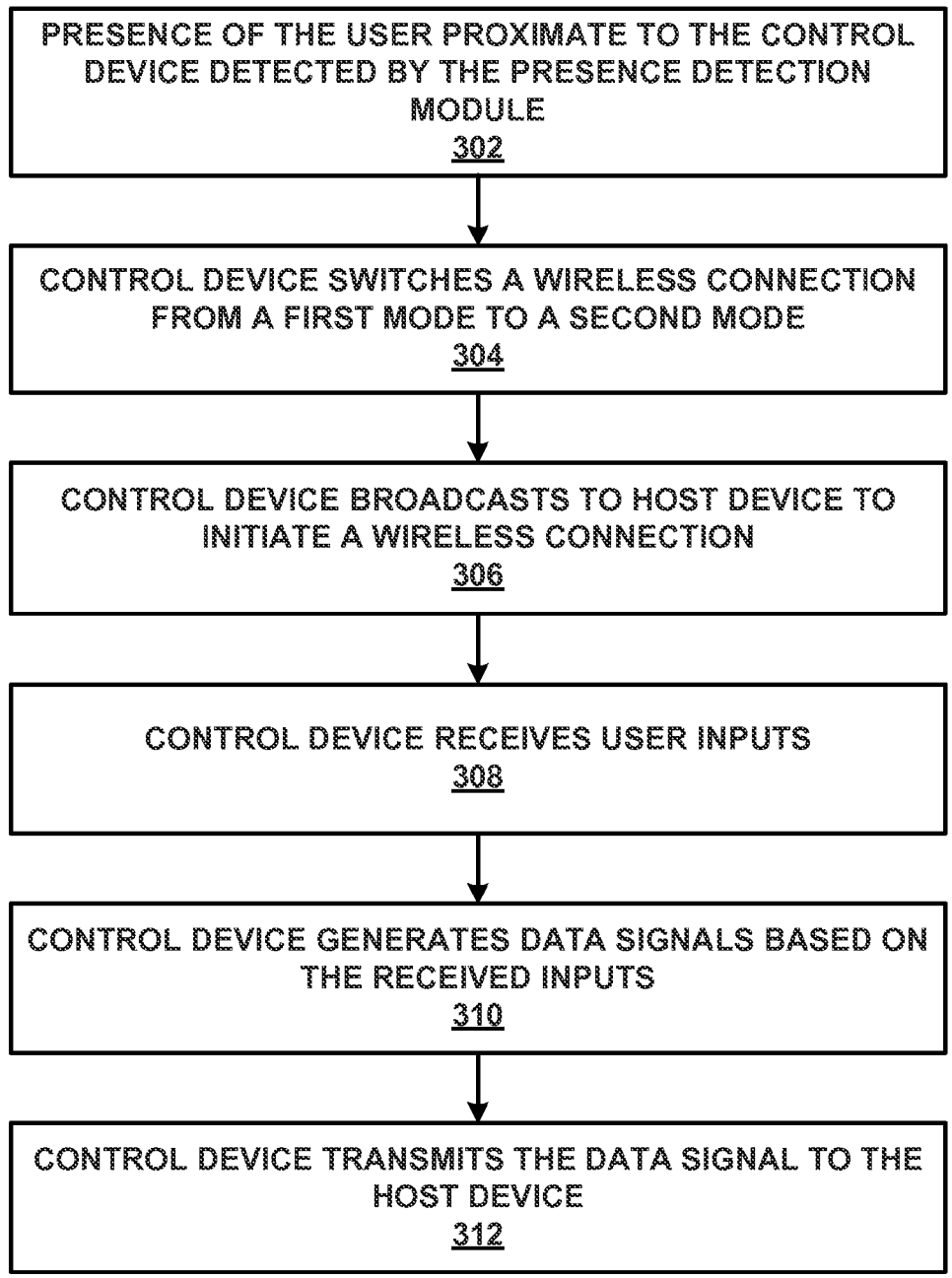
FIG. 4 is a simplified flowchart illustrating a method of pairing a wireless control device by detecting the presence of a user according to an embodiment of the invention.

FIG. 4 is a simplified flowchart illustrating a method of pairing a wireless control device by detecting the presence of a user according to an embodiment of the invention. The method 300 can be performed by processing logic that may comprise hardware (circuitry, dedicated logic, etc.), software (such as is run on a general purpose computing system or a dedicated machine), firmware (embedded software), or any combination thereof. The flowchart illustrated in FIG. 4 assumes that a connection profile between the control device and the host device has been previously established (e.g., for example, via a Bluetooth™ discovery process or a similar wireless connection).

The method includes a control device detecting a presence of a user proximate to the control device (302). In embodiments of the present invention, the control device detects the presence of the user prior to receiving inputs from one or more interactions by the user with the control device. The control device may include a presence detection module 240 that is configured to detect a presence of a user, body or object proximate to the control device. For example, the presence detection module 240 may be configured to detect a user moving within a certain range of the control device. By detecting the presence of the user or body in proximity to the control device, the control device can conduct additional operations (e.g., switch the control device from a sleep mode to an active mode, establish a pairing connection with a system or host device). In some embodiments, the presence detection module 240 continues to monitor while the control device is in the active mode such that when the presence detection module 240 does not detect the presence of the user, the control device can conduct different operations (e.g., switch the control device from the active mode to the sleep mode, disconnect the pairing connection with the system).

As noted previously, an exemplary method for detecting the presence of an object or a body in proximity to a control device is described in U.S. patent application Ser. No.

13/772,122, titled, "Method and System for Detecting an Object or Body Based on Changes in Signal Phases," filed on Feb. 20, 2013.

In some embodiments, the method further includes determining whether a length of time of the detected presence exceeds a threshold value. In such embodiments, the detected presence may be ignored when the length of time of the detected presence does not exceed the threshold value. Depending on the sensitivity of the presence detection module 240, the presence detection module 240 may detect minor changes in the environment (e.g. air movement, noise, an object moving far away in another room) that may register as a presence detection. By establishing a threshold time for determining whether to ignore or process a detected presence, power consumption may be reduced by not conducting the pairing (or connecting) process when the detected presence has a higher likelihood of being a false positive caused by the environment or by an unintended interaction.

The method further includes switching a wireless connection between the control device and the system from a first mode to a second mode (304). In some embodiments, switching the control device from the first mode to the second mode may be performed automatically without any physical interaction by the user with the control device. In some embodiments, when the presence detection module 240 detects the presence of the user in proximity to the control device, the presence detection module 240 may provide or send an indication to the power management block 260 (or the control circuit 220). The power management block 260 may then direct the power source 230 to increase the power within the control device to enable components within the control device to return the control device to the active mode and to reestablish a wireless connection with the system. The components in the control device may be configured to perform these operations once the presence detection module 240 detects the presence of the user in proximity to the control device, and without any interaction by the user with the control device.

In some embodiments, the first mode is a sleep mode. The sleep mode may be a low power consumption mode in which certain operations and components within the control device are shut down or put into an energy saving mode. For example, for a keyboard device 130 or mouse device 140, key, scrolling and button functionalities may be disabled. For a touchscreen device 150, a user interface 152 may be disabled. In addition, auditory and visual components may be disabled. In addition, wireless communication systems may be disabled when the control device is in the sleep mode.

In some embodiments, the second mode is an active mode. The active mode may be a higher power consumption mode in which many or all of the components within the control device are actively running. For example, for the keyboard device 130 or mouse device 140, key, scrolling and button functionalities may be enabled. For a touchscreen device 150, a user interface 152 may be enabled. In addition, auditory and visual components may be enabled. By placing the control device in the active mode, the control device may be able to receive input from the user and may be able to communicate with the system.

In some embodiments of the present invention, the method includes the control device broadcasting to the system to establish a wireless connection (306). In some embodiments, the control device may send a signal to the system indicating that the wireless connection should be established. In some embodiments of the present invention, the wireless connection may be established automatically without any physical interaction by the user with the control device. In some embodiments of the present invention, once the presence of the user is detected, and prior to the control device receiving inputs (e.g., keystrokes, selections, gestures) from one or more interactions with the control device, the control device may initiate a wireless connection with a system (e.g., a host device or host computer 110). The wireless connection may be a Bluetooth™ pairing connection or any other wireless standard or proprietary wireless network protocol.

The method further includes receiving inputs from the control device, wherein the received inputs include one or more user interactions with the control device (308). Examples of user interactions may include, but are not limited to: keystrokes, button clicks, scroll wheel movements, mouse movements along a surface, shifts in orientation of the mouse, mouse movements and gestures made while the mouse is in the air, and gestures made on a user interface of a touchpad device 150 or other control device (e.g., selecting objects, swiping along the user interface). In embodiments of the present invention the user interactions are received by the input module 210 of the control device. In some embodiments, the user interactions may be stored in the memory component 270 of the control device.

The method further includes generating data signals based on the received inputs (310). In embodiments of the present invention, once the control device receives inputs from the user, the data representing the received inputs may be used to generate data signals that are appropriate for the system or the host device that the received inputs were intended for. For example, the received inputs may be used to generate data signals that may be encrypted as required by a particular system or host device. In embodiments of the present invention, the data signals may be generated by the I/O and communications module 250.

The method also includes transmitting the data signals to the system by the wireless connection (312). In embodiments of the present invention, the generated data signals may be transmitted to the system or host device by the I/O and communications module 250. The data signals may be sent to the system or host device in a plurality of data packets across the wireless connection.

In embodiments of the present invention, when the wireless connection between the control device and the system is established, the presence detection module 240 continues to determine whether the presence of any object or body is detected in proximity to the control device. When the presence detection module 240 ceases detecting the user, the control device may disconnect the wireless connection and may enter into the sleep mode.

It should be appreciated that the specific steps illustrated in FIG. 4 provide a particular method of re-pairing a wireless control device by detecting the presence of a user according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
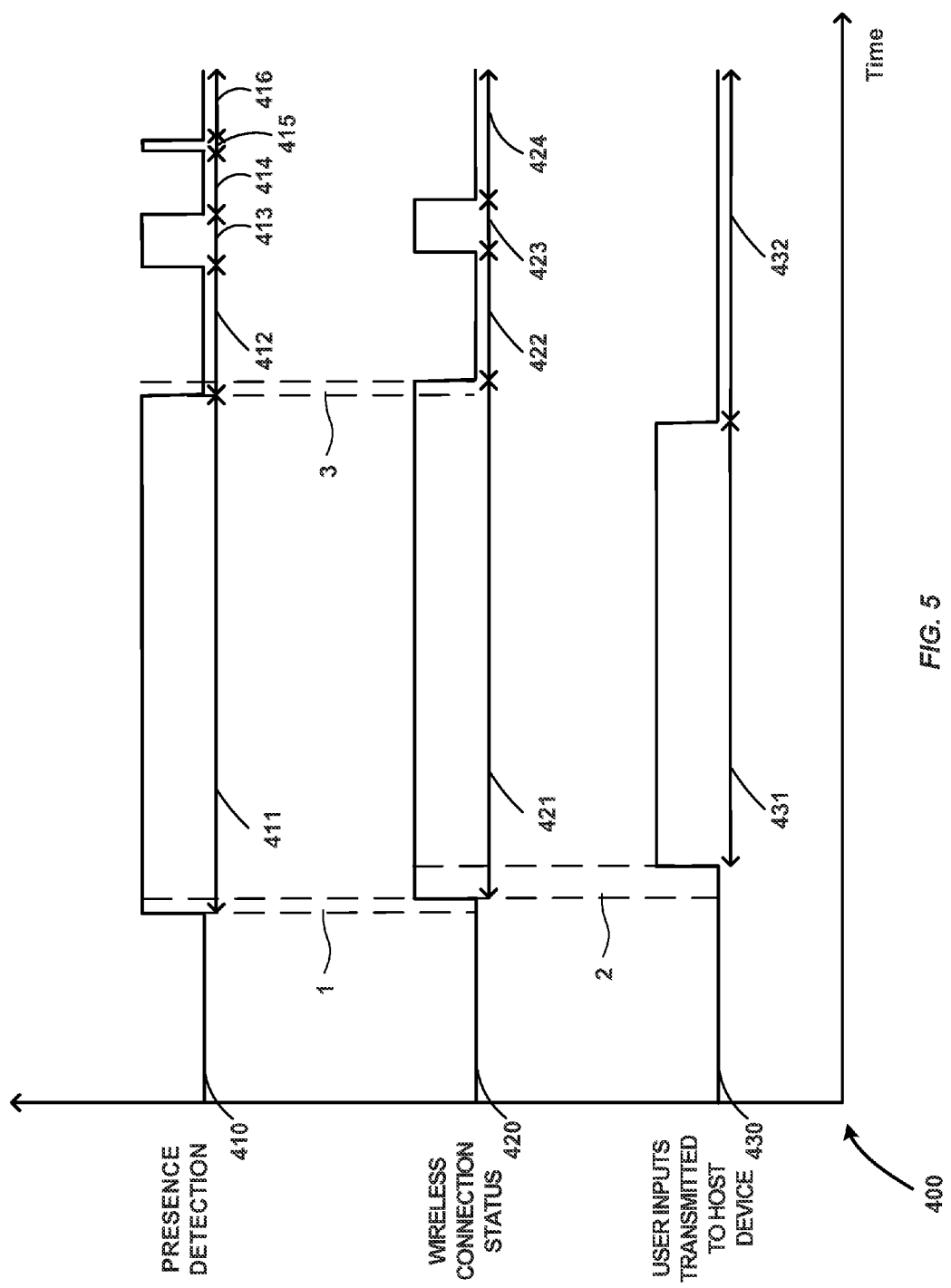
FIG. 5 illustrates a simplified signal diagram illustrating aspects of the process of pairing a control device with a host device when the presence of a user in proximity to the control device is detected by the control device, according to an embodiment of the invention.

FIG. 5 illustrates a simplified signal diagram illustrating aspects of the process of pairing a control device with a host device when the presence of a user in proximity to the control device is detected by the control device, according to an embodiment of the invention.

The signal diagram 400 includes a presence detection signal 410 that indicates when the present detection module 240 in the control device detects the presence of a user in proximity to the control device. The signal diagram 400 further includes a wireless connection status signal 420 that indicates the status of the wireless connection between the control device and a host device (e.g., the computer or the system). The signal diagram 400 further includes a user inputs signal 430 that indicates the transmission of received user inputs from the control device to the host device. In some embodiments of the present invention, the user inputs are received by the control device, and data signals generated by the control device based on the received user inputs are transmitted to the host device.

The charted signal representing the presence detection signal 410 includes a first period indicating a user or body has been detected by the presence detection module 240 in proximity to the control device 411, a first period indicating no user or body has been detected 412, a second period indicating a user or body has been detected by the presence detection module 240 in proximity to the control device 413, a second period indicating no user or body has been detected 414, a third period indicating a user or body has been detected by the presence detection module 240 in proximity to the control device 415, a third period indicating no user or body has been detected 416.

The charted signal representing the wireless connection status signal 420 includes a first period indicating when the wireless connection between the control device and the host device is active and established 421, a first period indicating when there is no active wireless connection between the control device and the host device 422, and second period indicating when the wireless connection between the control device and the host device is active and established 423, and a second period indicating when there is no active wireless connection between the control device and the host device 424.

The charted signal representing the user inputs signal 430 includes a first period indicating when data signals representing received inputs from the user are transmitted from the control device to the host device 421, and a first period indicating when there are no data signals representing received inputs from the user being transmitted from the control device to the host device 432.

In embodiments of the present invention, when the control device detects the presence of the user, a pairing (or wireless connection) process may be conducted between the control device and the host device. The pairing process may take a period of time indicated by time period 1, which starts when the presence of the user is detected and ends when the pairing process between the control device and the host device is completed.

In embodiments of the present invention, time period 2 represents the time period between the time when the pairing process is completed to the time when the control device begins sending data signals representing received user inputs to the host device.

In embodiments of the present invention, in order to reduce power consumption by the control device, the pairing between the control device and the host device may be disconnected. The pairing may be disconnected when the presence detection module in the control device does not detect the presence of the user in proximity to the control device. Such embodiments further allow for the control device to enter a low power consumption sleep mode when it is not in use.

In embodiments of the present invention, time period 3 represents the time period between the time that the presence detection module 240 in the control device stops detecting the presence of the user and the time for the paired connection between the control device and the host device to be disconnected. In some embodiments, the time period 3 may be the same, longer or shorter than the length of time to complete time period 1.

In alternative embodiments of the present invention, a plurality of control devices may be paired with the system. In such embodiments, a first wireless connection may be established between a first control device and the system, a second wireless connection may be established between a second control device and the system, etc. For example, a keyboard, a mouse, a remote control, a phone and/or other control devices may be paired with the system in any combination. The wireless connection may be a Bluetooth™ pairing connection or any other wireless standard or proprietary wireless network protocol. The wireless connections between the plurality of control devices and the system may be in either an active mode or an unconnected mode. In some embodiments of the present invention, only one control device may be in the active mode with the system, and all other control devices may be in the unconnected mode. In other embodiments of the present invention, more than one of the plurality of control devices may be in the active mode simultaneously.

In some embodiments of the present invention where only one control device is in the active mode at any time, while the wireless connection between the first control device and the system is in the active mode, the system may be configured to receive first data signals from the first control device. The first data signals may be based on inputs received at the first control device, including one or more interactions with the first control device by a user. At a later point, the system may receive an indication from the second control device indicating the presence of the user proximate to the second control device. This may be indicative that the user has moved from the first control device towards the second control device. In some embodiments of the present invention, the indication may be a data signal or other communications between the second control device and the host device that indicates that the second control device may begin sending data signals based on inputs received at the second control device.

The system may then switch the first wireless connection from the first mode (e.g., the active mode) to the second mode (e.g., the unconnected mode), and the second wireless connection from the second mode to the first mode. In such embodiments, when the second wireless connection switches to the first mode, the system may receive second data signals from the second control device. The second data signals may be based on inputs received at the second control device, including one or more interactions with the second control device by the user.

At a later time, the system may receive an indication from the first control device indicating the presence of the user proximate to the first control device. The system may then switch the second wireless connection from the first mode to the second mode and the first wireless connection from the second mode to the first mode. In such embodiments, the indication may be received by the system prior to receiving the first data signals from the first control device The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A method of managing wireless connections between a first control device, a second control device, and a remote computing device, the method comprising:
    associating the first control device and the second control device with the remote computing device;
    establishing a wireless connection between the first control device and the remote computing device;
    receiving first data signals from the first control device using the wireless connecting, wherein the first data signals are based on an interaction by a user with the first control device;
    receiving, by the remote computing device from the second control device, an indication when the user is proximate to the second control device prior to an interaction by the user with the second control device;
    disconnecting the wireless connection between the first control device and the remote computing device after the indication is received by the remote computing device from the second control device;
    establishing a wireless connection between the second control device and the remote computing device after the indication is received by the remote computing device from the second control device; and
    receiving second data signals from the second control device, wherein the second data signals are based on the interaction by the user with the second control device.

2. The method of claim 1, further comprising:
    receiving, by the remote computing device from the first control device, an indication when a user is proximate to the first control device prior to establishing the wireless connection between the first control device and the remote computing device.

3. The method of claim 1, wherein the interaction by the user with the second control device are one of a set of keystrokes, selections, or gestures on a display screen of the control device.

4. The method of claim 1, wherein the interaction by the user with the first control device are one of a set of keystrokes, selections, or gestures on a display screen of the control device.

5. The method of claim 1, wherein at least one or more of the first control device and the second control device is a keyboard device.

6. The method of claim 5, wherein the interaction using the keyboard device includes a set of keystrokes including a password.

7. The method of claim 1, wherein at least one or more of the first control device and the second control device is a mouse device.

8. The method of claim 7, wherein the interaction using the mouse device includes a selection made using the mouse device.

9. The method of claim 1, wherein at least one or more of the first control device and the second control device is a touchpad device.

10. The method of claim 9, wherein the interaction using the touchpad device includes at least a gesture made along a user interface of the touchpad device.

11. A remote computing device comprising:
    one or more processors; and
    a non-transitory computer-readable medium containing instructions that, when executed by the one or more processors, cause the one or more processors to perform operations including:
        associate a first control device and a second control device with the remote computing device;
        establish a wireless connection between the first control device and the remote computing device;
        receive first data signals from the first control device using the wireless connecting, wherein the first data signals are based on an interaction by a user with the first control device;
        receive, from the second control device, an indication when the user is proximate to the second control device prior to an interaction by the user with the second control device;
        disconnect the wireless connection between the first control device and the remote computing device after the indication is received by the remote computing device from the second control device;
        establish a wireless connection between the second control device and the remote computing device after the indication is received by the remote computing device from the second control device; and
        receive second data signals from the second control device, wherein the second data signals are based on the interaction by the user with the second control device.

12. The remote computing device of claim 11, further comprising instructions that, when executed by the one or more processors, cause the one or more processors to perform operations including:
    receive, from the first control device, an indication when a user is proximate to the first control device prior to establishing the wireless connection between the first control device and the remote computing device.

13. The remote computing device of claim 11, wherein the interaction by the user with the second control device are one of a set of keystrokes, selections, or gestures on a display screen of the control device.

14. The remote computing device of claim 11, wherein the interaction by the user with the first control device are one of a set of keystrokes, selections, or gestures on a display screen of the control device.

15. The remote computing device of claim 11, wherein at least one or more of the first control device and the second control device is a keyboard device.

16. The remote computing device of claim 15, wherein the interaction using the keyboard device includes a set of keystrokes including a password.

17. The remote computing device of claim 11, wherein at least one or more of the first control device and the second control device is a mouse device.

18. The remote computing device of claim 17, wherein the interaction using the mouse device includes a selection made using the mouse device.

19. The remote computing device of claim 11, wherein at least one or more of the first control device and the second control device is a touchpad device.

20. The remote computing device of claim 19, wherein the interaction using the touchpad device includes at least a gesture made along a user interface of the touchpad device.

* * * * *